Sept. 1, 1942.   O. FRANKENTHAL ET AL   2,294,865
METHOD OF MAKING DECORATED ARTICLES
Filed Feb. 28, 1939   2 Sheets-Sheet 1
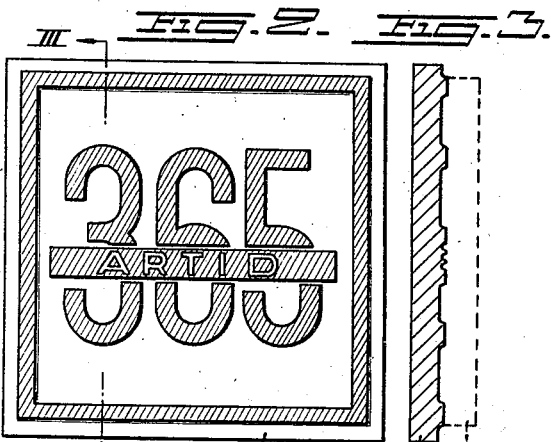
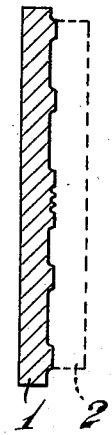
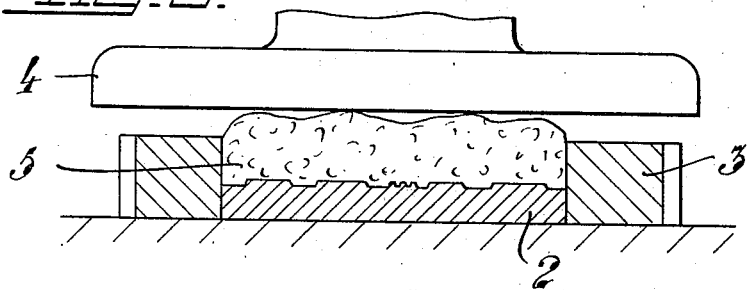
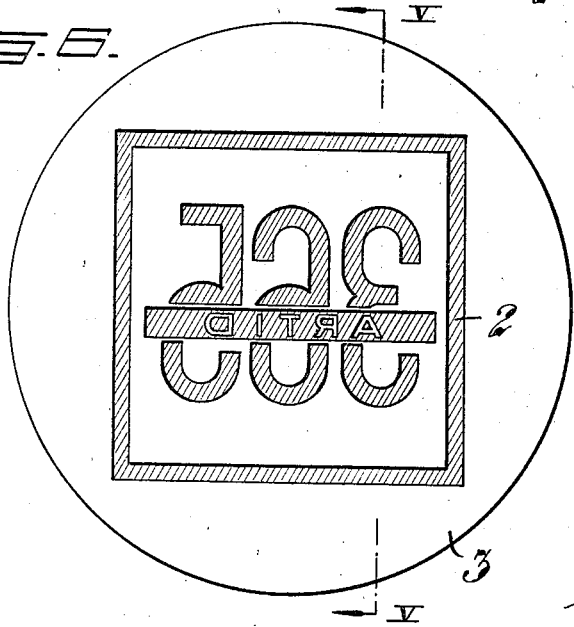
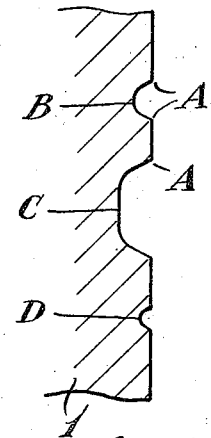
Inventors:
Otto Frankenthal
Robert Lederer
By Samuel E. Markle
Their Attorney

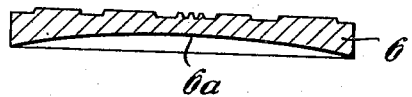
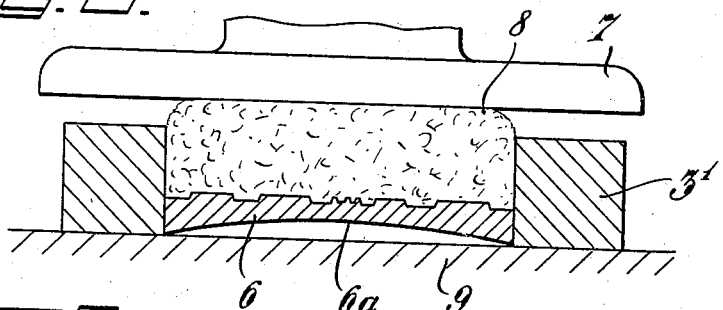
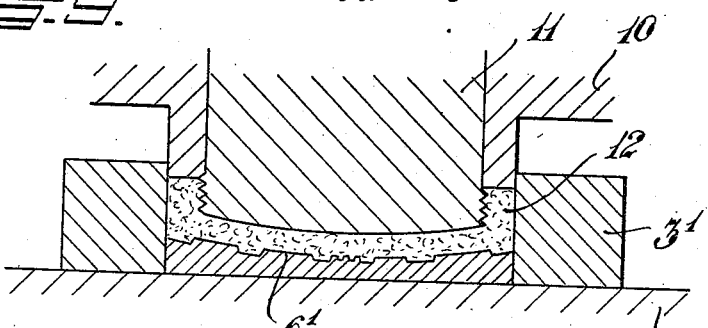
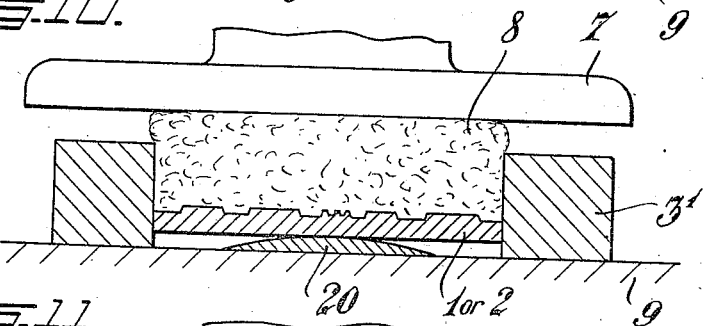
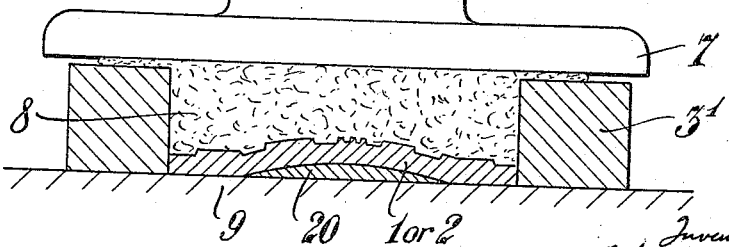

Patented Sept. 1, 1942

2,294,865

UNITED STATES PATENT OFFICE 2,294,865

METHOD OF MAKING DECORATED ARTICLES

Otto Frankenthal, Slough, England, and Robert Lederer, New York, N. Y., assignors to Aktiebolaget Swedish Artid, Stockholm, Sweden, a joint-stock company of Sweden Application February 28, 1939, Serial No. 258,932 In Great Britain March 25, 1938

8 Claims. (Cl. 18—61)

This invention refers to the moulding of articles of plastic, hardening masses, such as synthetic resin.

Coloured embellishments and inscriptions can be applied to synthetic resin by painting with a brush just as on wood and metal. Little use has hitherto been made, however, of this possibility of obtaining a desired artistic result, since painting by hand is a very costly procedure.

The manufacture of moulds for the production of moulded articles of plastic masses in large quantities has hitherto been a very expensive matter since, in order that moulded articles having fine designs impressed thereon can be moulded, a very expensive engraving process in a very hard metal has been employed for forming the surface of the mould. It will further be appreciated that in making such moulds for automatic colouring it is essential that the cut-away portions shall all have their lowermost surfaces at exactly the same level in the metal since it is these lowermost surfaces which form, in the moulded article, the raised parts of the design. If the engraving or etching is uneven in depth, the raised portions of the design on the moulded article will be uneven in height and, where the design is to be coloured by mechanical means, for example, a roller, the unevenness in the plane of the uppermost surfaces of the design would render an automatic colouring process impossible. Accordingly the surface of the depressed elements in the mould used for turning out the product must lie in the same plane. It is very difficult, however, to fulfill this condition when the moulds are made by engraving. In moulds made by etching, it is absolutely impossible to fulfill this condition. In addition, for fine designs, the edges between the plane surface and the depressed portions of the product must be sharp and clearly defined. Hitherto also the moulds have been formed from a very hard metal, since it was thought that the use of a soft metal would be quite impracticable owing to the surface of the mould becoming deformed during the moulding operation.

The chief object of this invention is to render it possible to manufacture, readily and at a low price, a number of articles of hardening plastic embossed with the same design and coloured.

Another object of this invention is to render it possible to make the design on such articles either raised or sunk (intagliated) or both and to colour it mechanically.

Another object of this invention is to manufacture the moulds for pressing or diecasting such articles, of a metal or metal alloy having a Brinell hardness value between 10 and 85, and preferably between 20 and 50. Aluminium and aluminium alloys are preferred.

A further object of this invention consists in that the matrix is prepared chemigraphically (photo-mechanically) from a drawn, printed, photographic or written original of the design to be embossed upon the article.

Other objects will be evident from the following specification and claims.

The method according to the invention will now be described with reference to examples.

Fig. 1 shows an original of the design.

Fig. 2 is a plan view of a matrix made after this original.

Fig. 3 shows a section on the line III—III of Fig. 2.

Fig. 4 shows a part of Fig. 3, on a larger scale.

Fig. 5 shows a side view of a pressing tool for pressing synthetic resin moulding powders, partially in section (on the line V—V in Fig. 6).

Fig. 6 is a plan view of the bottom part of the pressing tool.

Fig. 7 shows a cross-section through another embodiment of a part of a pressing mould.

Fig. 8 is a side view partially in cross-section and shows how the tool part of Fig. 7 is pressed to a concave shape.

Fig. 9 shows a sectional view of a pressing tool for pressing synthetic resin, using the tool part shown in Figs. 7 and 8.

Figs. 10 and 11 illustrate the pressing of a convex mould by means of an inserted concave piece of metal.

Figs. 1-6 refer to the production of a plaque, and Figs. 7-9 to the production of a decorated screw lid.

Referring now to Figs. 1-6 of the drawings, an original, which is to be reproduced on a plaque of synthetic resin, is shown in Fig. 1. It is desired to have those elements of the design, which are black in Fig. 1, flush (in one plane) in the plaque to be produced.

The matrix shown in Figs. 2 and 3 is made, after the original, by applying an image of the original, that is positive (non-reserved) and can be read in the ordinary way from the left to the right, in acid-proof printing ink on a metal plate 1, for example a brass plate, dusting with asphalt, and then etching the brass plate. Any of the methods commonly employed in the production of printing blocks may be used for transferring the image. Chemigraphical methods (including photo-gravure) are preferred.

The etching has the effect of lowering the level of the parts of the surface not covered by the etchproof protective coating. The etching is preferably carried out in stages so that the sides of the elements of the writing shall form an obtuse angle with the plane upper surface thereof. In the etched brass plate the numerals "365" are shaped as in a high-relief printing block and the letters "Artid" as in a bas-relief (intagliated) printing-block. In contrast to a printing-block, however, both the numerals and the letters are so disposed as to be readable in the ordinary way. It is thus evident that the design may be made raised (high-relief) or depressed (intaglio), but in both cases the surface of matrix is plane, and the edges between this plane surface and the recessed portions are sharp and clearly defined.

Using the brass plate 1 as a die an aluminium plate or block 2 is then stamped. The stamped plate 2 thus has impressed upon it the reverse or negative or the original design, and is then reduced to the size of the plaque to be produced, by planing or filing down the edge thereof, and is finally fitted in a rectangular aperture of a steel frame 3. The steel frame 3 constitutes together with the stamped aluminium plate 2 a hollow mould part which can be filled with moulding powder 5. The top die 4 coacting with the hollow mould part consists of a flat rectangular steel plate. The dimensions of the die are preferably greater than the dimensions of the frame 3, so that the top and bottom dies coact as an overflow mould. Of course, the steel plate 4 may be provided with a second mould-part to produce an article having designs moulded on both sides.

Instead of pressing the matrix 1 into the aluminium plate, the matrix may be electro-plated on its etched surface in the usual electro-plating baths; when a suitable thickness of metal has been deposited, the matrix is removed from the electrolytic bath, the deposited metal stripped from it and the underneath of the metal plate thus formed is planed or machined flat and the plate then reduced to the required size by planing and filing the edges thereof and finally fitted in a steel frame, as mentioned above. Or metal may be sprayed or cast on the matrix 1 to form the mould part. Also a combination of such methods may be used.

Those surfaces which are flush are indicated by shading in Figs. 2 and 6. In Fig. 2 the flush parts are raised and in Fig. 6 they are intagliated. The edges A between the flush parts and the other parts are sharp and clear, as shown in Fig. 4. At their bottom the etched parts are rounded (due to the etching) and the bottoms B, C, D are not flush. Generally a narrow part, like D, will be shallower than a broad part, like B or C. Thus, if the matrix 1 was pressed directly into synthetic resin, it would yield a product, whose surface would have ridges (corresponding to B, C, D, etc.) of uneven heights and with rounded edges. Such product cannot be coloured mechanically.

On the moulded article produced with the aid of the pressing tool shown in Figs. 5 and 6, the writing appears in the same arrangement as on the etched brass plate shown in Fig. 2. The raised, flushed portions of this product may be coloured by passing an inked roller thereover.

If only the recessed portions are to be coloured the entire surface of the moulded article is coated with colouring matter, for example, with the aid of a brush and the moulded article wiped against a stretched cloth soaked in solvent capable of dissolving the colouring matter used. If desired, another colour may then be applied to the raised portions by passing an inked roller thereover. Also more than two colours may be applied mechanically, for instance, by passing rollers with different ink over different parts of the surface. The recessed portions of the moulded article may also be coloured by staining. For this purpose greasy paint is applied to the moulded articles by means of rollers so that this paint remains adhering to the elements standing out in high-relief or greasy paint is applied to the intagliated parts. The moulded article is then treated with stain which only acts upon the unprotected parts. Finally, the paint is removed.

It is found that moulds made in accordance with the invention are capable of being used successfully in a considerable number of moulding cycles before they become deformed and that the cost of manufacturing from a single matrix the number of moulds necessary to produce the same number of articles that can be moulded from a single die of steel is considerably less than the cost of a single mould of the kind hitherto used.

The metal or metal alloy, of which the mould 2 is made, should have a Brinell hardness value between 10 and 85, preferably between 20 and 50. Articles to be produced on a very large scale are moulded in moulds made of steel and stamped with the aid of etched hard steel dies. Sometimes the matrix or the mould may be nickeled or coated with other hard metal.

Usually, the mould 2 is made of aluminium or an aluminium alloy.

It is frequently desirable that the embossed design or some part of it should be non-planar, that is, that the design should be on a surface that is concave or convex or partially concave and partially convex, such as a corrugated surface, while such surface is still so regular and smooth that it can be coloured mechanically by means of a pad, a roller or the like. For this purpose, according to this invention the underside of the metal plate, or a part of it, is, after embossing, ground or machined concave or convex (or partially concave and partially convex), the plate enclosed in a rigid frame and the metal plate deformed so that the underside becomes flat whereby the embossed surface of the metal plate is formed concave or convex (or concave-convex) respectively, without impairing its truly plane characteristics, as far as the colouring process is concerned.

It is, however, sometimes possible to press a curved matrix (for instance, produced by a stereotypic process) into a curved surface of a metal block.

In the embodiment illustrated in Figs. 7–9, a metal plate 6 (of the same type as the plate 2 in Fig. 6) is hollowed out on its back side to a concave recess 6a, for instance, by grinding. The recessed plate 6 is then placed in a steel frame 3¹ (Fig. 8), a plastic mass 8 is placed on it and pressure is applied by means of a press piston 7. The pressure causes the plate 6 to be flattened down on the lower platen 9 of the press, rendering the picture side of the matrix concave, as shown at 6¹ in Fig. 9.

Thereafter the plastic mass is removed, the hollow mould part 3¹, 6¹ is filled with synthetic resin moulding material and the upper steel die 10, 11 is pressed down to shape a screw lid 12.

Those surfaces of said screw lid which are shaped by the steel mould parts 3¹, 10 and 11 will have exactly the predetermined dimensions. A slight difference from the predetermined dimension may occur at right angles to the concave, decorated surface of the lid at 6¹ but this difference, being only a small fraction of one millimeter, is of no importance and the decoration is nevertheless exact, clean and sharp. After removal from the mould, the decorated surface of the lid may be coloured mechanically in one or more colours.

The method illustrated in Figs. 6–9 for producing a curved mould may, of course, be used for curving the matrix, from which a curved mould may then be produced, for instance, by depositing metal on the matrix.

Thus, for those parts of the article which shall have exact dimensions and are not decorated, one or more ordinary mould parts of steel are used, while for the decorated surfaces one or more mould parts in accordance with this invention are used. The articles produced consequently have exact dimensions, where necessary, and have decorations on those surfaces in which small variations (fractions of a millimeter) in dimensions are permissible. And on the decorated surfaces the designs are exact and show accurate details, because the surfaces are correct, the small variations in dimensions being only at right angles to the surfaces.

For reproducing fine pictures (drawings, etchings, engravings or the like) it is preferred to transfer a positive image of the picture to a plane metal plate and etching such plate in such manner (for instance, by photo-gravure) that the lines of the image are etched down into the plane surface, while the remainder of the surface remains unchanged. When this plate is pressed into the aluminium block (or metal is deposited thereon), the resulting aluminium mould has a true plane basic surface, on which the design stands out in raised lines, the edges between said lines and the basic surface being sharp and clear (while the upper edges of said raised lines are rounded and are generally not in the same plane). Such mould is entirely new in the art and renders a moulded article of synthetic resin having sharp lines intagliated into a plane surface. These lines are capable of exact mechanical colouring because their edges at the plane surface are sharp. The article thus produced in accordance with the preferred embodiment of the invention, is also entirely new in the art and may have aesthetic effects not otherwise obtainable in synthetic resin.

It will be understood that the above procedure may be adapted with the articles having concavities or convexities by a suitable adaption of the process described above.

Due to the fact that for pressing synthetic resin products, a raw material is used which is pulverulent or has a pulverulent character, even when formed to the usual tablets to be introduced into the presses, and—above all—due to the fact that a uniform pressure on all sides is necessary for a good result, the moulding method in accordance with this invention renders it possible to manufacture products of synthetic resin with fine coloured designs, which cannot—or cannot economically—be produced in any other way.

Especially for embossing, on synthetic resin products and in intagliated technics, pictures (such as drawings, etchings, engravings etc.) with fine details and subtile shades the method in accordance with this invention renders results heretofore not attained. The finest points, lines and shades can be accurately and exactly pressed into the synthetic resin and coloured.

Obviously, the matrix 1 may be machined on its underside (backside) to a concave, convex or similar shape, as described above for the plate 6 in connection with Figs. 6–9. Then the matrix is flattened down on a plane surface, and the mould plate 2 is made therefrom, preferably by depositing metal on the matrix. The metal plate 2 then has a non-planar, smooth continuous surface, for instance, like that illustrated in Fig. 9.

Instead of machining the matrix 1 or the metal plate 2 on its back side, it is, of course, possible to press it down upon a concave or convex (or concave-convex) metal piece 20 so that the active or front surface of the matrix 1 or plate 2 is altered accordingly. If the metal plate 2 is deformed in that way the metal piece just mentioned is inserted into the mould together with the plate 2 and remains there as a part of the mould. This method is illustrated in Figs. 10 and 11.

Embellished synthetic resin products can be produced very inexpensively by the method according to the invention, however complicated the embellishment may be. At the same time the products obtained in accordance with the invention also have the advantage that the embellishment is not only coloured but also is in relief and is thus much more effective, durable and permanent than when produced by painting or by printing.

It will be appreciated that in the manufacture of designs embodying letters or other similar characters the letters or characters may either be formed by parts raised above the general plane of the base or by parts recessed below the general plane of the base.

The invention also includes the manufacture of coloured embossed moulded articles which comprises die-casting or pressing a mouldable material in the mould according to this invention and applying a colour composition to the surface of the raised parts of the design by means of rollers, pads or the like' such as the ordinary printing ink roller. Alternatively, where it is desired that the raised parts of the design shall be uncoloured and the lower parts of the design coloured, the whole of the surface of the moulded article may be covered with a colour composition which may be removed from the raised parts of the design by passing the design over a stretched cloth impregnated with a solvent for the colour composition or a fabric-coated roller impregnated with the colour composition solvent or by wiping off the colour composition from the raised parts.

Where it is required to colour the sunk portions of the moulded article an alternative procedure consists in first applying a greasy paint to the raised parts so as to prevent any colouring matter from adhering to the coated parts. A suitable colour composition is then applied over the whole of the surface of the design and the greasy paint then removed from the raised portions by any suitable means, for example, by wiping with a cloth impregnated with a solvent therefor; the raised parts of the moulded article may, if desired, then be coloured with a different colour composition having the desired tint by means of the usual printing roller or may be allowed to remain self-coloured.

The invention is particularly applicable to the moulding of articles from mouldable plastic material, for example, synthetic resins, which harden during the operation but it may also be applied to any readily mouldable material to be hardened in other way.

In some instances it may be desirable to form moulded articles which in general or partially are of concave or convex contour. For instance, in the reproduction, by moulding, of pictures, it may be required to make the picture protrude beyond the general plane of a surround and in such instance the mould may be made by forming the underside of the metal plate with a convex portion so that, during the first moulding operation, the underside of the plate is flattened by the collapsing of the material, as descried in detail above. The convex portion formed on the underside of the plate will, of course, be in a position corresponding to that part of the picture which is to be raised.

In this specification and in the claims, "a truly plane surface" means a smooth, even, continuous surface, whether planar or concave or convex or partly concave and partly convex. Geometrically, the surface proper may be described as planar, cylindrical, spherical, or as a surface of rotation in general, or as a combination of such surfaces. A strict geometrical definition of such surface is hardly possible, but for practical purposes it may be defined as a surface which itself can be coloured mechanically by means of inking rollers, pads or the like, or of which the impression into a mouldable material can be thus coloured.

What we claim is:

1. A method of manufacturing decorated articles, comprising, etching a graphic design, positive and non-reversed, into a truly plane surface of a metal block, transferring the design in the block directly unto a plate having a thickness greater than the depth of the recessed portions to be formed therein, whereby the recessed portions of said negative plate conform to the truly plane surface of said block, fitting said plate in other mould parts of hard metal to form a composite mould, pressing plastic hardenable material to form an article by means of said composite mould, whereby the raised portions of the design in said article are truly plane, and mechanically colouring the recessed portions of said design in said article.

2. A method of manufacturing articles decorated with a coloured graphic design, comprising, etching said design, positive and non-reversed, into a truly plane surface of a metal block member, transferring the design in said block directly unto a metal plate member having a thickness greater than the depth of the recessed portions to be formed therein, bending said plate to a curved shape, pressing plastic hardenable material by means of said negative metal plate to form an article, whereby the raised portions of the embossed design form a bent, regular surface capable of being coloured mechanically, and mechanically colouring the recessed portions of said design in said article.

3. A method of manufacturing decorated articles, comprising, etching a design, positive and non-reversed, into a truly plane surface of a metal block member, transferring the design in said block directly unto a metal plate member having a thickness greater than the depth of the recessed portions to be formed therein, machining a portion on the back-side of one of said members to a curved shape, subjecting the machine part to pressure in such manner that said back-side is pressed flat again, pressing plastic hardenable material by means of said negative metal plate to form an article, whereby the raised portions of the embossed design therein form a bent regular smooth surface capable of being coloured mechanically, and mechanically colouring the recessed portions of said design in said article.

4. A method as claimed in claim 2, wherein said one of said members is bent to a curved shape by being pressed against a correspondingly curved piece of hard metal.

5. The method of rapidly and economically molding and coloring a sharply defined design in an article formed of moldable hardening material that includes the following steps: etching the design positive and non-reversed into a metal block having a common straight-line surface, whereby the unetched portions of the design are in a common straight line surface in said block; transferring the thus etched design directly unto a negative-receiving plate having a thickness greater than the depth of the design, whereby the recessed portions thus formed are in a common straight line surface in said plate; pressing said material against said plate to form an article bearing the design, whereby the raised portions of the design thus impressed are in a common straight line surface in said article; and mechanically applying color to the recessed portions of the design in said article, while preventing the color from adhering to said raised surfaces in said article.

6. The method of rapidly and economically molding and coloring a sharply defined design in an article formed of moldable hardening material that includes the following steps: etching the design positive and non-reversed into a metal block having a common straight-line surface, whereby the unetched portions of the design are in a common straight line surface in said block; transferring the thus etched design directly unto a negative-receiving plate having a thickness greater than the depth of the design, whereby the recessed portions thus formed are in a common straight line surface in said plate; pressing said material against said plate to form an article bearing the design, whereby the raised portions of the design thus impressed are in a common straight line surface in said article; mechanically applying color to said recessed portions and to said raised surfaces of the design in said article, and subsequently removing the color from said raised surfaces.

7. The method of rapidly and economically molding and coloring a sharply defined design in an article formed of moldable hardening material that includes the following steps: etching the design positive and non-reversed into a metal block having a common straight-line surface whereby the unetched portions of the design are in a common straight line surface in said block; depositing metal on said block to a thickness greater than the depth of said design to form thereby a negative-receiving plate, whereby the recessed portions thus formed are in a common straight line surface in said plate; pressing said material against said plate to form an article bearing the design, whereby the raised portions of the design thus impressed are in a common straight line surface in said article; and mechanically applying color to the recessed portions of the design in said article, while preventing the color from adhering to said raised surfaces in said article.

8. The method of rapidly and economically molding and coloring a sharply defined design in an article formed of moldable hardening material that includes the following steps: etching the design positive and non-reversed into a metal block having a common straight-line surface, whereby the unetched portions of the design are in a common straight line surface in said block; transferring the thus etched design directly unto a negative-receiving plate having a thickness greater than the depth of the design, whereby the recessed portions thus formed are in a common straight line surface in said plate; pressing said material against said plate to form an article bearing the design, whereby the raised portions of the design thus impressed are in a common straight line surface in said article; mechanically applying a covering material to said raised surfaces in said design, mechanically applying color to said recessed portions in said design and subsequently removing said covering material.

OTTO FRANKENTHAL.
ROBERT LEDERER.